United States Patent
Matsumoto

(10) Patent No.: US 9,465,168 B2
(45) Date of Patent: Oct. 11, 2016

(54) POLARIZATION BEAM SPLITTER AND OPTICAL DEVICE

(71) Applicant: NEC Corporation, Tokyo (JP)

(72) Inventor: Takashi Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/786,956

(22) PCT Filed: Jan. 10, 2014

(86) PCT No.: PCT/JP2014/000066
§ 371 (c)(1),
(2) Date: Oct. 23, 2015

(87) PCT Pub. No.: WO2014/174735
PCT Pub. Date: Oct. 30, 2014

(65) Prior Publication Data
US 2016/0103281 A1      Apr. 14, 2016

(30) Foreign Application Priority Data

Apr. 24, 2013   (JP) .................................. 2013-091272

(51) Int. Cl.
*G02B 6/27* (2006.01)
*G02B 6/293* (2006.01)
(Continued)

(52) U.S. Cl.
CPC ......... *G02B 6/2773* (2013.01); *G02B 6/12004* (2013.01); *G02B 6/126* (2013.01); *G02B 6/2726* (2013.01); *G02B 6/2938* (2013.01);
(Continued)

(58) Field of Classification Search
CPC .. G02B 6/126; G02B 6/2726; G02B 6/2773; G02B 6/29302; G02B 2006/12097; G02B 2006/121; G02F 1/225

USPC ......................................................... 385/1–3
See application file for complete search history.

(56) References Cited

U.S. PATENT DOCUMENTS

2004/0247276 A1* 12/2004 Bonar ................ G02B 6/12021
                                                              385/129
2004/0264836 A1* 12/2004 Kawashima ....... G02B 6/12011
                                                              385/14

(Continued)

FOREIGN PATENT DOCUMENTS

JP     2003-222748      8/2003
WO     WO 2005/003852 A1    1/2005

(Continued)

OTHER PUBLICATIONS

International Search Report mailed Feb. 4, 2014 in corresponding PCT International Application.

*Primary Examiner* — Ryan Lepisto
(74) *Attorney, Agent, or Firm* — Finnegan, Henderson, Farabow, Garrett & Dunner LLP

(57) ABSTRACT

A polarization beam splitter includes a demultiplexer, a multiplexer, a first waveguide at least partially formed of a rib waveguide, and a second arm waveguide at least partially formed of a channel waveguide. Waveguide widths of the first and second waveguides are configured to cause, with respect to a linear polarization component of an input light of the polarization beam splitter, 1) a first refractive index of the first arm waveguide and a second refractive index of the second arm waveguide to be the same, and 2) changes of the first and second refractive indexes, due to changes of the respective waveguide widths, to be the same.

5 Claims, 13 Drawing Sheets

(51) Int. Cl.
  *G02F 1/225* (2006.01)
  *G02B 6/12* (2006.01)
  *G02B 6/126* (2006.01)

(52) U.S. Cl.
  CPC .......... *G02F 1/225* (2013.01); *G02B 6/29302* (2013.01); *G02B 2006/121* (2013.01); *G02B 2006/12097* (2013.01)

(56) References Cited

U.S. PATENT DOCUMENTS

| | | |
|---|---|---|
| 2006/0072866 A1 | 4/2006 | Mizuno et al. |
| 2006/0120657 A1 | 6/2006 | Little |
| 2007/0196042 A1 | 8/2007 | Little |
| 2010/0046886 A1* | 2/2010 | Doerr ............... G02B 6/105 385/27 |
| 2012/0063716 A1* | 3/2012 | Mizuno ............ G02B 6/12007 385/11 |
| 2013/0216175 A1* | 8/2013 | Onishi ............. H04B 10/5053 385/1 |

FOREIGN PATENT DOCUMENTS

| | | |
|---|---|---|
| WO | WO 2010/021671 A2 | 2/2010 |
| WO | WO 2010/140363 A1 | 12/2010 |

* cited by examiner

POLARIZATION BEAM SPLITTER AND OPTICAL DEVICE

CROSS-REFERENCE TO RELATED PATENT APPLICATIONS

This application is a National Stage Entry of International Application No. PCT/JP2014/000066. filed Jan. 10, 2014. which claims priority from Japanese Patent Application No. 2013-091272. filed Apr. 24, 2013. The entire contents of the above-referenced applications are expressly incorporated herein by reference.

TECHNICAL FIELD

The present invention relates to a polarization beam splitter and an optical device.

BACKGROUND ART

Recently, optical communication transmission systems have been drastically changed. That is, these transmission systems have been changed from the IM-DD (Intensity Modulation-Direct Detection) system, which had been the system in mainstream use in the past, to a system in which coherent detection is conducted as typified by QPSK (Quadrature Phase Shift Keying). More particularly, research and development has been conducted on DP-QPSK (Dual Polarization-Quadrature Phase Shift Keying) systems in which signals are superimposed on an orthogonal polarization and a phase, as a target for optical transmissions of 40 Gbps or more. Some of these systems have been launched as products.

In the DP-QPSK systems, a coherent receiver is used as a key component. This coherent receiver includes a PLC (Planer Lightwave Circuit) type optical coherent mixer, a polarization beam splitter (PBS), a photo detector (PD), and a trans impedance amplifier (TIA). These components are shipped from a number of device vendors. For example, Patent Literature 1 discloses a polarization beam splitter using $SiO_2$.

Further, as a future prospect, a small coherent receiver called "Generation 2" has been studied in the MSA (Multi Source Agreement). This small coherent receiver requires further miniaturization of the PLC. In particular, Si photonics that uses Si as a base material of an optical waveguide has attracted attention. In Si photonics technology, the refractive index difference between Si and $SiO_2$ is large, and thus it is expected that a small bend radius due to strong light confinement will be achieved. In Si photonics technology, it is expected that PD integration using Ge, PBS integration using large form birefringence, and the like will also be achieved.

CITATION LIST

Patent Literature

Patent Literature 1: Japanese Unexamined Patent Application Publication No. 2003-222748

SUMMARY OF INVENTION

Technical Problem

As PBSs fabricated using Si photonics technology, a directional coupler type PBS using an Si-wire waveguide, an MMI (Multi Mode Interferometer) type PBS, an MZI (Mach Zehnder Interferometer) type PBS using a rib waveguide, and the like have been proposed. However, these PBSs are not yet suitable for production application, and therefore these PBSs have not been commercialized yet.

The conventional PBSs fabricated using Si photonics technology have the following problems. First, in the directional coupler type PBS using an Si-wire waveguide, it is difficult to control the interval between two waveguides. Further, since a propagation loss of the waveguides themselves is large, it is difficult to use the waveguides as an optical integrated circuit. The same applies to the MMI type PBS.

On the other hand, a propagation loss in the MZI type PBS using a rib waveguide is smaller than that using a wire waveguide. However, it is difficult to control the refractive index of two arms that constitute the MZI, so that a sufficient manufacturing tolerance cannot be ensured.

It is an object of the present invention to provide a polarization beam splitter and an optical device with high productivity.

Solution to Problem

An exemplary aspect of the present invention is a polarization beam splitter including: a demultiplexer that demultiplexes input light into first input light and second input light; a multiplexer that multiplexes the first input light and the second input light, the first input light and the second input light being obtained by demultiplexing the input light by the demultiplexer; a first arm waveguide that guides the first input light to the multiplexer, at least a part of the first arm waveguide being formed of a rib waveguide; and a second arm waveguide that guides the second input light to the multiplexer, at least a part of the second arm waveguide being formed of a channel waveguide. The first and second arm waveguides are formed with a waveguide width at which, in one of linear polarization components orthogonal to each other, a refractive index of the first arm waveguide with respect to the input light is the same as a refractive index of the second arm waveguide with respect to the input light and a refractive index change of the first arm waveguide with respect to a change in the waveguide width is the same as a refractive index change of the second arm waveguide with respect to a change in the waveguide width. In the other one of the orthogonal polarization components, a phase difference is generated between the first input light propagating through the first arm waveguide and the second input light propagating through the second arm waveguide.

Advantageous Effects of Invention

According to the present invention, it is possible to provide a polarization beam splitter and an optical device with high productivity.

DESCRIPTION OF EMBODIMENTS

Figure 1:
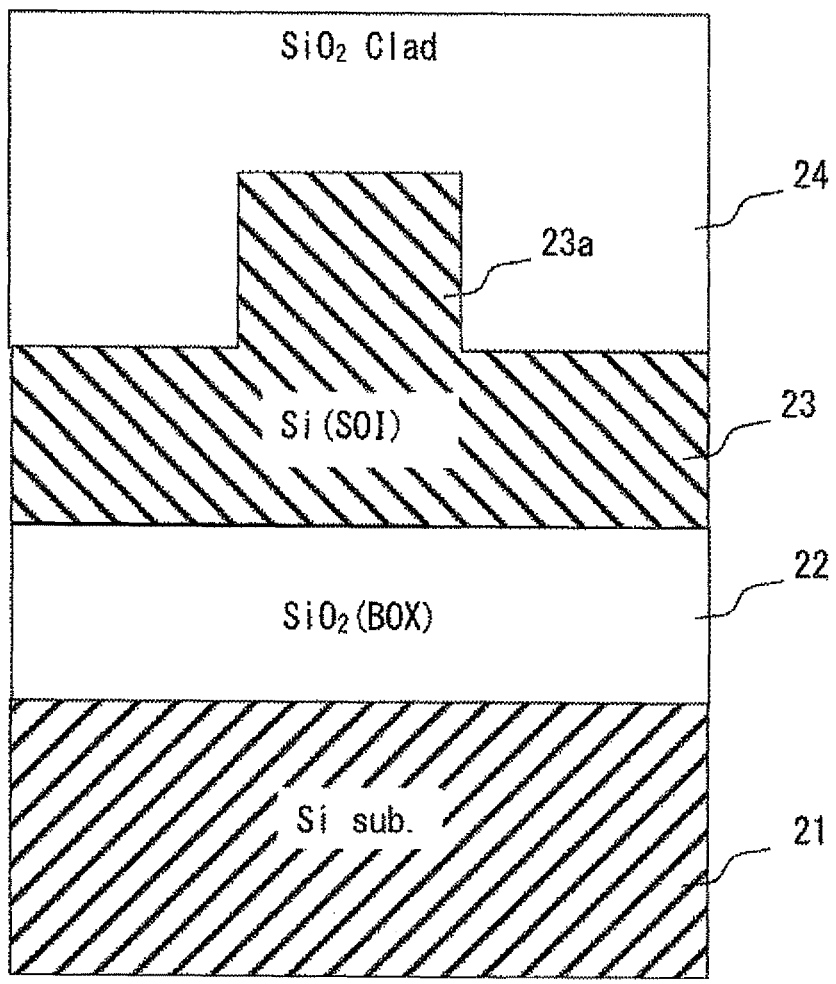
FIG. 1 is a diagram showing a cross-section of a rib waveguide.

Exemplary embodiments of the present invention will be described with reference to the accompanying drawings. The following exemplary embodiments are examples of the present invention, and the present invention is not limited to the following exemplary embodiments. The same reference numerals in the specification and the drawings denote the same components.

Figure 2:
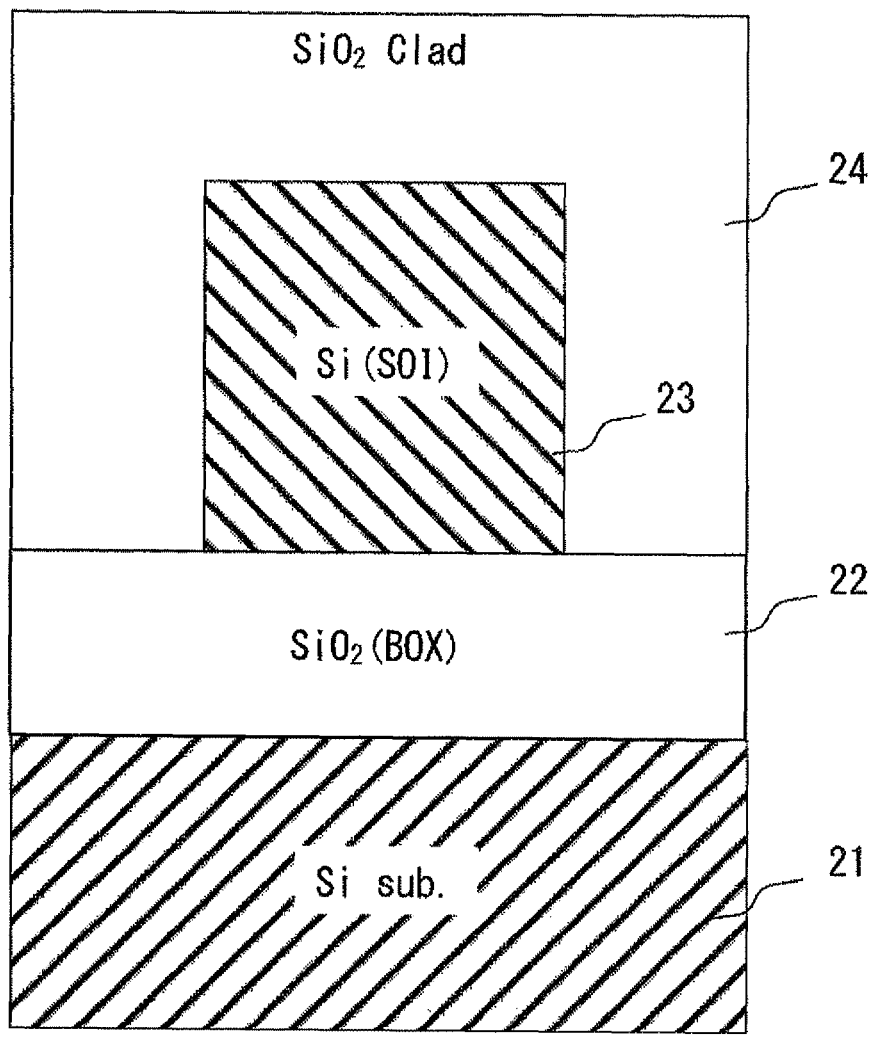
FIG. 2 is a diagram showing a cross-section of a channel waveguide.

A PBS according to an exemplary embodiment of the invention includes silicon waveguides. In each silicon waveguide, a relative index difference between a core and a clad can be increased. Accordingly, the minimum bend radius of a silicon waveguide can be reduced compared to that of a silica waveguide. The silicon waveguide has two types of structures, i.e., a rib-type structure and a channel-type structure. FIG. 1 shows a cross-sectional view of a silicon waveguide having a typical rib-type structure, and FIG. 2 shows a cross-sectional view of a silicon waveguide having a typical channel-type structure.

Each of a rib waveguide 50 and a channel waveguide 51 includes a substrate 21, a lower clad layer 22, a core layer 23, and an upper clad layer 24. The lower clad layer 22 is formed on the substrate 21 which is a silicon substrate. In this case, the lower clad layer 22 is an $SiO_2$ film and is formed of, for example, a buried oxide film (BOX). The core layer 23 is formed on the lower clad layer 22. The core layer 23 is an Si film such as an SOI (Silicon On Insulator) substrate. The upper clad layer 24 is formed on the core layer 23. The upper clad layer 24 is, for example, an $SiO_2$ film. The core layer 23 is formed of a material having a refractive index different from that of the lower clad layer 22 and the upper clad layer 24.

In a cross-section of the rib-type structure, the core layer 23 includes a rib 23a that projects upward. Both sides of the rib 23a are covered with the upper clad layer 24. The thickness of the rib-type structure varies in a range from about 1 to 3 μm. The bend radius of the rib-type structure is about 200 μm, which is not as small as that of the channel-type structure, and the propagation loss of the rib-type structure is 0.5 to 1.0 dB/cm, which is smaller than that of the channel-type structure. The waveguide is formed by the stepper exposure, and thus sufficient characteristics can be obtained. Therefore, the productivity of the waveguide is higher than in a case where the waveguide is formed by EB exposure.

In the channel-type structure, the cross-section of the core layer 23 serving as a waveguide has a substantially rectangular shape. The upper clad layer 24 covers the core layer 23. The lower clad layer 22 and the upper clad layer 24 cover the entire core layer 23. The polarization beam splitter PBS according to this exemplary embodiment has both the channel-type structure and the rib-type structure.

The PBS according to an exemplary embodiment is used for a coherent mixer element. The coherent mixer element is, for example, a planar lightwave circuit (PLC), and includes a polarization beam splitter (PBS) and a 90-degree optical hybrid (90° OH). The PBS is a circuit having a polarization beam splitting function. The PBS splits light into linear polarization components orthogonal to each other and outputs the linear polarization components. The PBS is, for example, a Mach-Zehnder interferometer that uses the birefringence of arm waveguides. The 90-degree optical hybrid is a circuit (coherent mixer circuit) having a function for retrieving phase information.

Figure 3:
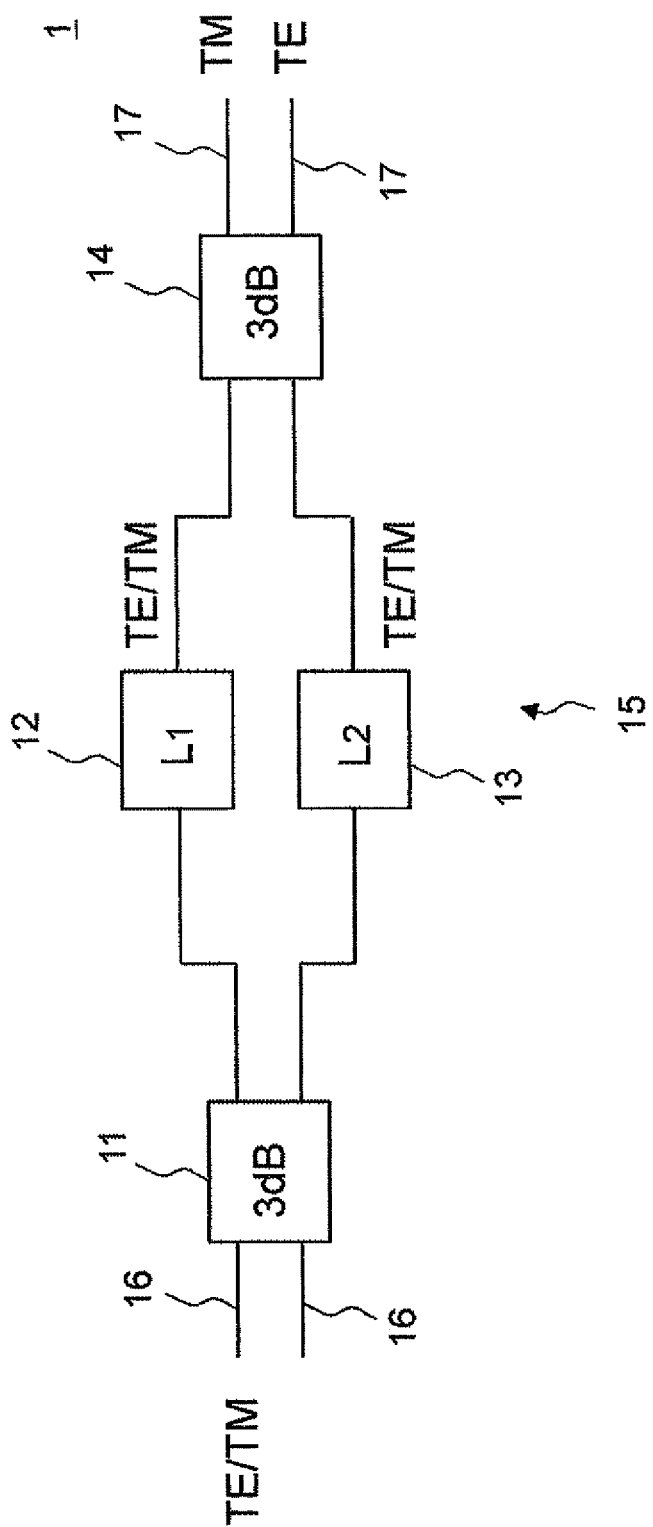
FIG. 3 is a schematic view showing an overall configuration of a PBS.

FIG. 3 is a diagram schematically showing an overall configuration of an MZI-type PBS. A PBS 1 is a Mach-Zehnder polarization beam splitter which is monolithically integrated in a coherent mixer element. The PBS 1 includes a demultiplexer 11, a multiplexer 14, an arm portion 15, input waveguides 16, and output waveguides 17. The arm portion 15 includes a first arm waveguide 12 and a second arm waveguide 13. The arm portion 15 is disposed between the demultiplexer 11 and the multiplexer 14. The arm portion 15 constitutes a Mach-Zehnder interferometer. The demultiplexer 11 and the multiplexer 14 are, for example, MMI (Multi Mode Interference) couplers. The demultiplexer 11 is a 2-input/2-output coupler, and the multiplexer 14 is also a 2-input/2-output coupler. For example, the demultiplexer 11 and the multiplexer 14 are 3 dB couplers. Alternatively, a directional coupler, a Y-branching device, and the like can be used as the demultiplexer 11 and the multiplexer 14.

The demultiplexer 11 is coupled to the input waveguides 16 and demultiplexes input light into first input light and second input light. For example, the demultiplexer 11 divides signal light at a ratio of 50:50, thereby generating the first input light and the second input light. The demultiplexer 11 is coupled to the first arm waveguide 12 and the second arm waveguide 13. The first input light, which is obtained by demultiplexing the input light by the demultiplexer 11, propagates through the first arm waveguide 12. The second input light, which is obtained by demultiplexing the input light by the demultiplexer 11, propagates through the second arm waveguide 13. The first arm waveguide 12 and the second arm waveguide 13 are each coupled to the multiplexer 14. The first arm waveguide 12 guides the first input light to the multiplexer 14, and the second arm waveguide 13 guides the second input light to the multiplexer 14.

The multiplexer 14 multiplexes the first input light propagating through the first arm waveguide 12 and the second input light propagating through the second arm waveguide 13. The multiplexer 14 is coupled to the two output waveguides 17. The multiplexer 14 outputs TE (Transverse Electric) polarized light from one of the output waveguides 17, and outputs TM (Transverse Magnetic) polarized light from the other output waveguide 17. Thus, the polarization beam splitter PBS splits the input light into polarized waves. The PBS 1 splits the light into TM polarized light and TE polarized light which are linear polarization components orthogonal to each other, and outputs the TM polarized light and the TE polarized light.

The demultiplexer 11 and the multiplexer 14 are formed of the same type of silicon waveguides. For example, the demultiplexer 11 and the multiplexer 14 are formed of rib-type silicon waveguides. Note that the demultiplexer 11 and the multiplexer 14 may be formed of channel-type silicon waveguides. Formation of the demultiplexer 11 and the multiplexer 14 using the channel waveguide 51 leads to downsizing. At least a part of the first arm waveguide 12 is formed of a rib waveguide. At least a part of the second arm waveguide 13 is formed of a channel waveguide. That is, one of the two arm waveguides is formed of the rib waveguide 50, and the other one of the two arm waveguides is formed of the channel waveguide 51.

When the demultiplexer 11 and the multiplexer 14 are each formed of the rib waveguide, the second arm waveguide 13 is provided with a transition region from the rib waveguide to the channel waveguide and a transition region from the channel waveguide to the rib waveguide. The entire first arm waveguide 12 is formed of the rib waveguide 50. On the other hand, when the demultiplexer 11 and the multiplexer 14 are each formed of the channel-type silicon waveguide 51, the second arm waveguide 13 is provided with a transition region from the channel waveguide 51 to the rib waveguide 50 and a transition region from the rib waveguide to the channel waveguide. The entire multiplexer 14 is formed of the channel waveguide 51.

Figure 4:
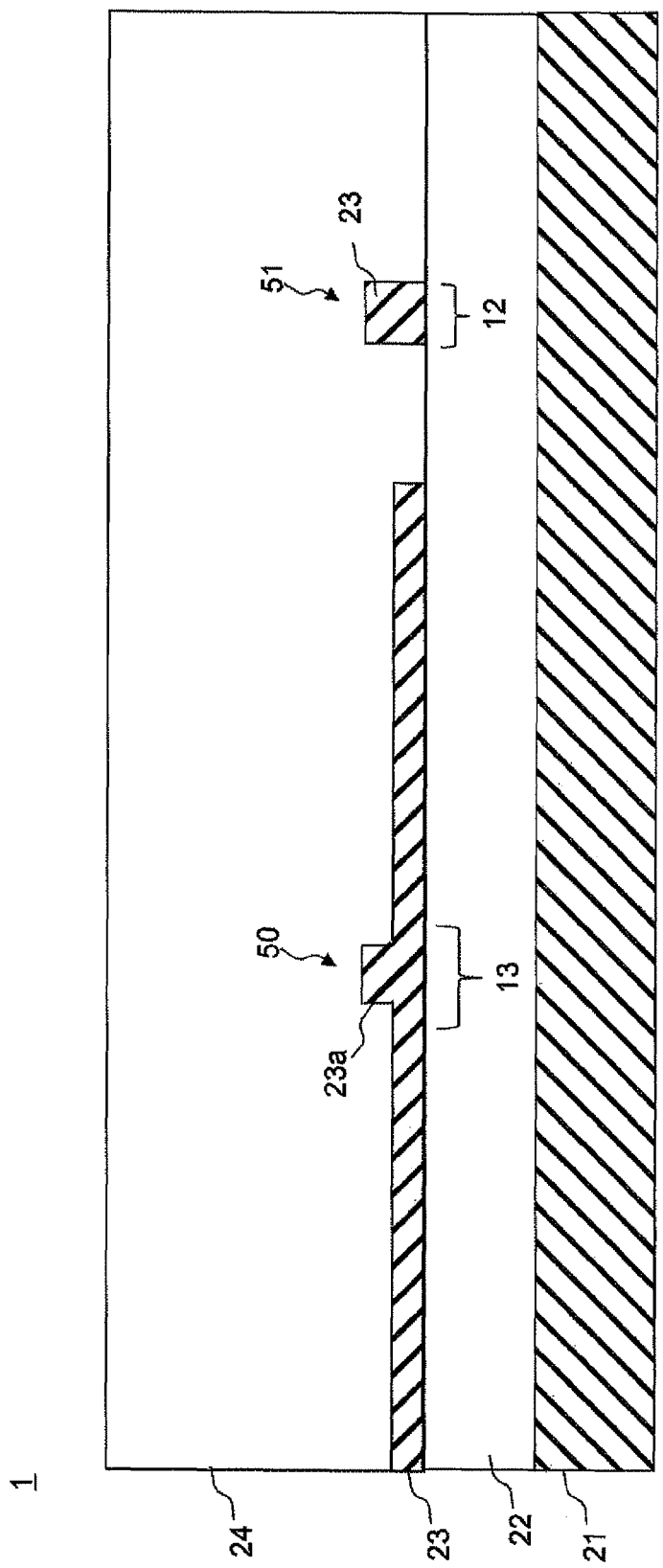
FIG. 4 is a cross-sectional view of the configuration of the PBS.

FIG. 4 shows a cross-sectional view of the PBS 1 at the arm portion 15. As shown in FIG. 4, the first arm waveguide 12 is formed of the channel waveguide 51, and the second arm waveguide 13 is formed of the rib waveguide 50. The upper clad layer 24 is disposed between the core layer 23 of the rib waveguide 50 and the core layer 23 of the channel waveguide 51. Accordingly, the core layer 23 of the rib waveguide 50 and the core layer 23 of the channel waveguide 51 are formed so as to be separated from each other. In the rib waveguide 50, the light is confined in the vicinity of the rib 23a. In the rib waveguide 50, the region in which the light is confined is slightly larger than the rib 23a. For this reason, the light propagates not only through the rib 23a, but also through a portion below the rib 23a and through the core layer 23 in the vicinity of the rib 23a. In the channel waveguide 51, the light is confined in the core layer 23. Further, in the rib waveguide 50, the core layer 23 is formed so as to be increased in width within a range in which no optical power can be detected. The thickness of the core layer 23 including the rib 23a of the rib waveguide 50 is substantially the same as the thickness of the core layer 23 of the channel waveguide 51.

The basic operation of the MZI-type PBS 1 will be described. In order to show the PBS operation in the MZI-type PBS 1 as shown in FIG. 3, it is necessary to satisfy the following Expressions (1) and (2).

$$(2\pi/\lambda) \times n_{TE1} L_1 - (2\pi/\lambda) \times n_{TE2} L_2 = 0 \qquad (1)$$

$$(2\pi/\lambda) \times n_{Tm1} L_1 - (2\pi/\lambda) \times n_{Tm2} L_2 = \pi \qquad (2)$$

In Expressions (1) and (2), $\lambda$ represents an operating wavelength; $L_1$ represents an arm length of the first arm waveguide 12; $L_2$ represents a waveguide length of the second arm waveguide 13; $n_{TE1}$ represents a refractive index of TE polarized light in the first arm waveguide 12; $n_{TE2}$ represents a refractive index of TE polarized light in the second arm waveguide 13; $n_{TM1}$ represents a refractive index of TM polarized light in the first arm waveguide 12; and $n_{TM2}$ represents a refractive index of TM polarized light in the second arm waveguide 13.

When two light beams split by the demultiplexer 11 are in phase with respect to the TE polarized light between the arms and the phases between the two light beams are shifted from each other by $\pi$, with respect to TM polarized light, the TE polarized light and the TM polarized light are output from different output ports. At this time, the phase condition of the TE polarized light may be replaced by the phase condition of the TM polarized light. That is, the two light beam split by the demultiplexer 11 may be in phase with respect to the TM polarized light and the two light beams split by the demultiplexer 11 may be in opposite phase with respect to the TE polarized light.

Figure 5:
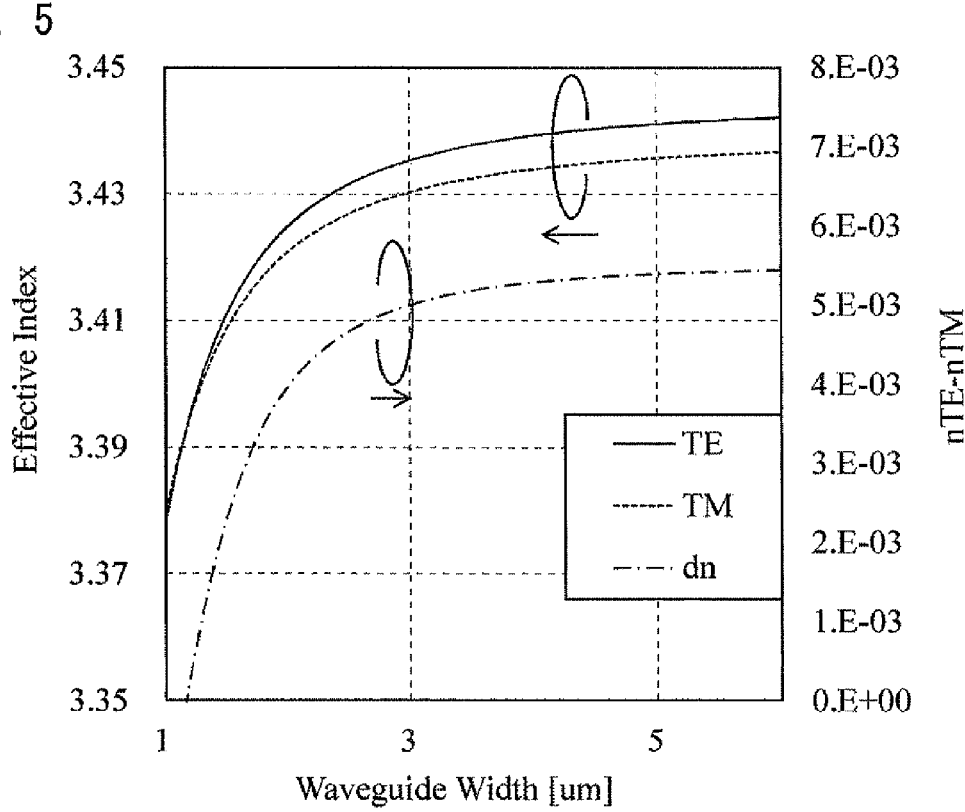
FIG. 5 is a graph showing a dispersion relation of an Si rib waveguide.

Next, FIG. 5 shows a dispersion relation of an Si rib waveguide which has been studied by the present inventor. FIG. 5 shows the calculation results assuming that the thickness of the core layer 23 including the rib 23a is 1.5 µm and the depth of the rib 23a is 0.925 µm. In FIG. 5, the horizontal axis represents a waveguide width and the vertical axis represents a refractive index. Also, in FIG. 5, a difference ($n_{TE} - n_{TM}$) between a refractive index with respect to TE polarized light and a refractive index with respect to TM polarized light is represented by "dn". The refractive index difference do indicates the magnitude of birefringence. A birefringence of the order of about $10^{-3}$ can be expected. It is clear that a birefringence sufficient to form the PBS 1 is obtained.

Figure 6:
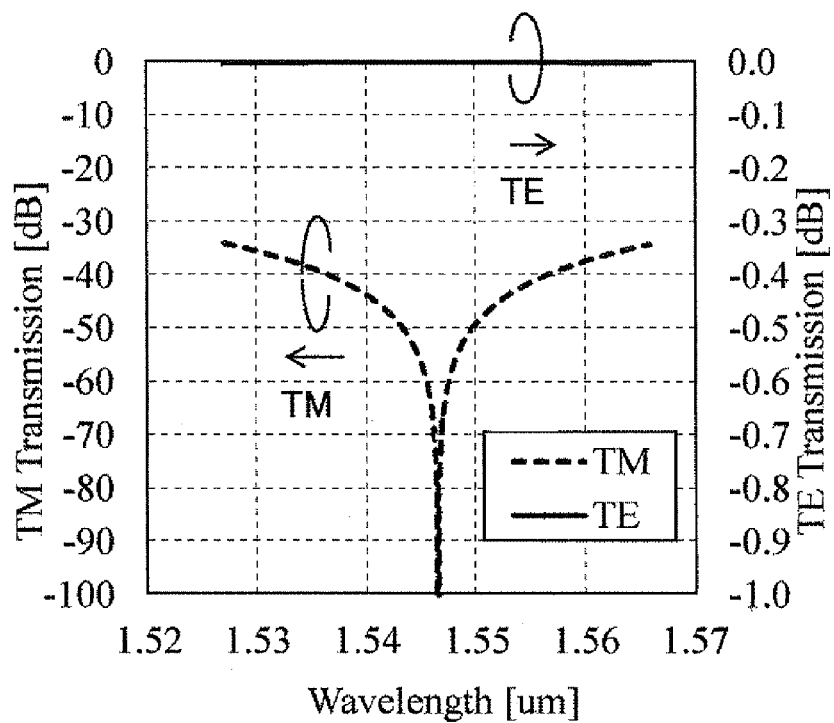
FIG. 6 is a graph showing an example of a PBS spectrum when two arm waveguides are each formed of a rib waveguide.

FIG. 6 shows an example of a transmission spectrum obtained when the PBS 1 is formed so as to satisfy the phase condition of Expression (1). In this case, the first arm waveguide 12 and the second arm waveguide 13 are each formed of the rib waveguide 50, and the widths of the first arm waveguide 12 and the second arm waveguide 13 are set to 1.5 µm and 3 µm, respectively. In FIG. 6, the horizontal axis represents an operating wavelength and the vertical axis represents a loss (transmission) of TE polarized light and a loss (transmission) of TM polarized light. As the difference between a loss of TE polarized light and a loss of TM polarized light increases, a polarization extinction ratio increases. In a C-band, the PBS 1 having a polarization extinction ratio of 30 dB or more can be formed. However, in the actual process, it is highly likely that the waveguide width will deviate from the design value.

Figure 7:
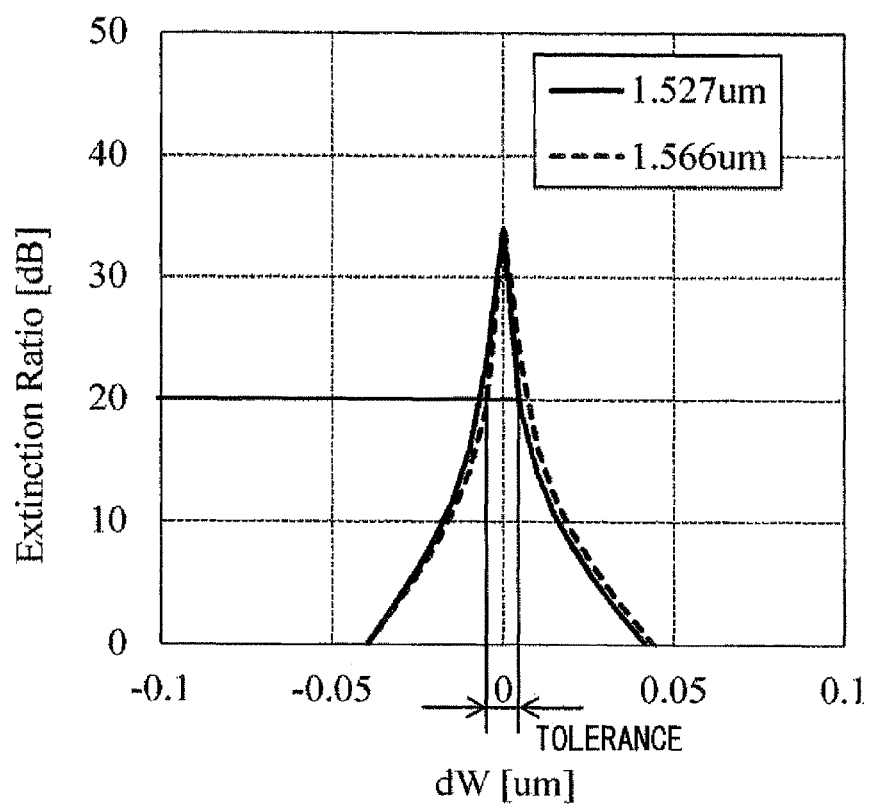
FIG. 7 is a graph showing a tolerance for a waveguide width when two arm waveguides are each formed of a rib waveguide.
Figure 8:
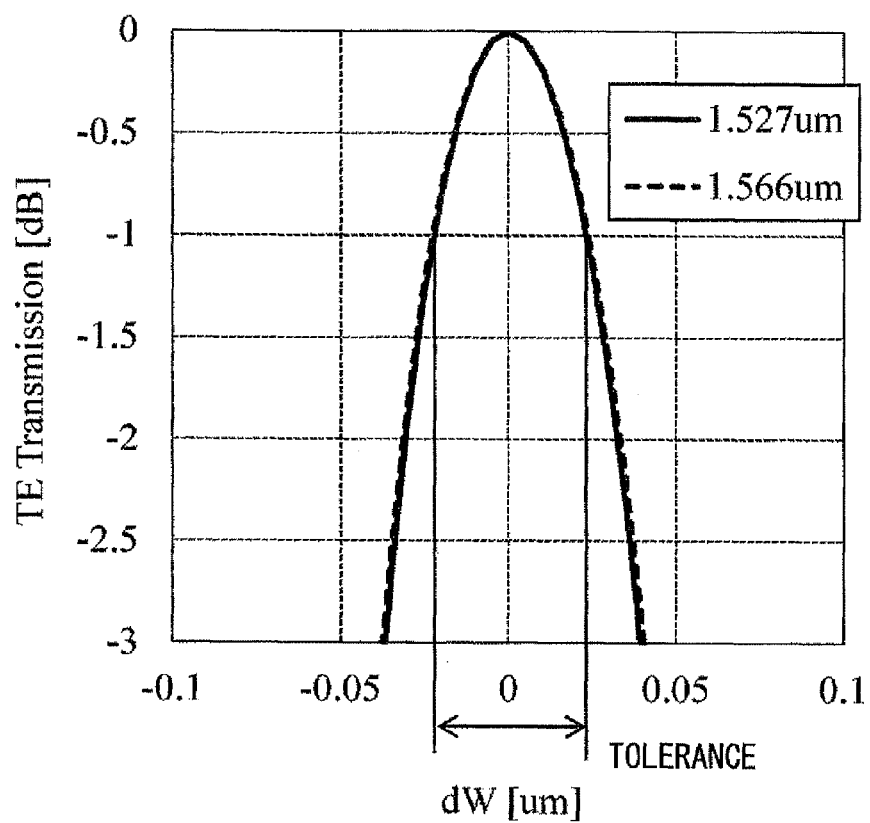
FIG. 8 is a graph showing a tolerance for a waveguide width when two arm waveguides are each formed of a rib waveguide.

In this regard, FIGS. 7 and 8 show an excess loss and a polarization extinction ratio when each waveguide width is changed by dW from the design value. In FIG. 7, the horizontal axis represents a deviation dW of the waveguide width from the design value, and the vertical axis shows a polarization extinction ratio. In FIG. 8, the horizontal axis represents the deviation dW of the waveguide width from the design value, and the vertical axis represents a loss.

It is most difficult to ensure a sufficient tolerance at ends of the bandwidth. Accordingly, FIGS. 7 and 8 show a loss and a polarization extinction ratio with respect to two wavelengths, i.e., a longest wave (1.566 µm) and a shortest wave (1.527 µm), in the C-band. Further, since the first arm waveguide 12 and the second arm waveguide 13 are close to each other, it is assumed that the waveguide widths of the first arm waveguide 12 and the second arm waveguide 13 change in the same manner. In other words, it is assumed that the waveguide widths of the first arm waveguide 12 and the second arm waveguide 13 deviate from the design value by substantially the same amount. Both the excess loss and the polarization extinction ratio show an extremely sharp change with respect to a fluctuation of the waveguide width. Assuming herein that the polarization extinction ratio of 20 dB, which is practically required, is set as a standard, only a tolerance of about ±5 nm is allowed, which makes it difficult to commercialize the PBS.

These fluctuations in the loss and the polarization extinction ratio are caused because the refractive index of each arm waveguide changes due to fluctuations in the waveguide width, so that Expressions (1) and (2) cannot be satisfied. Especially, in the waveguide of 1.5 µm, the dispersion relation rapidly changes. This rapidly deteriorates the characteristics of the PBS 1 and makes it difficult to commercialize the PBS 1.

Therefore, in this exemplary embodiment, the two arm waveguides of the PBS 1 are formed of waveguides with different structures. Specifically, as shown in FIG. 4, the first arm waveguide 12 is formed of the channel waveguide 51 and the second arm waveguide 13 is formed of the rib waveguide 50. Further, the dispersion relation of TE polarized light or TM polarized light in one of the two arm waveguides is matched with that in the other one of the two arm waveguides. With this configuration, the PBS 1 resistant to a process variation in the waveguide width can be achieved. If the refractive index of TE polarized light in one of the two arm waveguides is the same as that in the other one of the two arm waveguides, i.e., if $n_{TE1}=n_{TE2}$ holds, Expression (1) shows $L_1=L_2$. In other words, when the refractive index of the first arm waveguide 12 and the refractive index of the second arm waveguide 13 are the same with respect to one of linear polarization components orthogonal to each other, the arm length (waveguide length) of the first arm waveguide 12 is substantially the same as the arm length (waveguide length) of the second arm waveguide 13. Accordingly, Expression (2) can be transformed into the following Expression (3).

$$(2\pi/\lambda) \times n_{Tm1}L_1 - (2\pi/\lambda) \times n_{Tm2}L_2 = \pi \rightarrow L = \lambda/(2(n_{TM1}-n_{TM2}))  \quad (3)$$

When $L_1=L_2=L$ is satisfied in Expression (2), Expression (3) is obtained. Accordingly, the arm length of the PBS 1 is determined only by the difference of a refractive index of TM polarized light between two arm waveguides. In other words, since $n_{TE1}=n_{TE2}$ holds, the phase difference in TE polarized light is 0, regardless of the arm length L.

Figure 9:
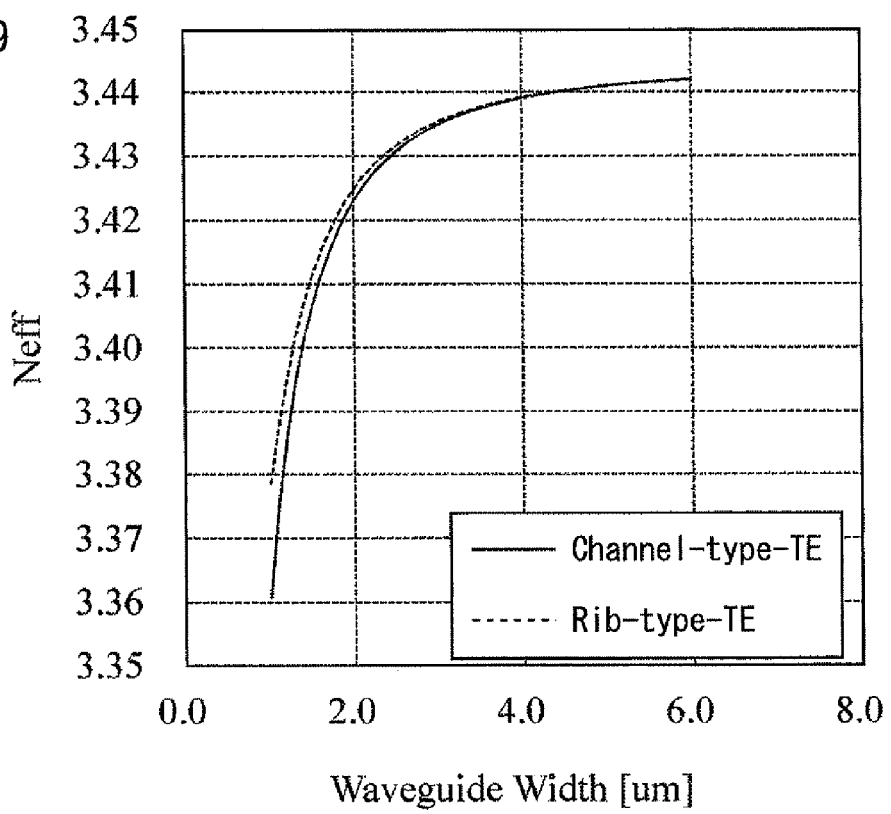
FIG. 9 is a graph showing a dispersion relation of a channel waveguide and a rib waveguide in TE polarized light.
Figure 10:
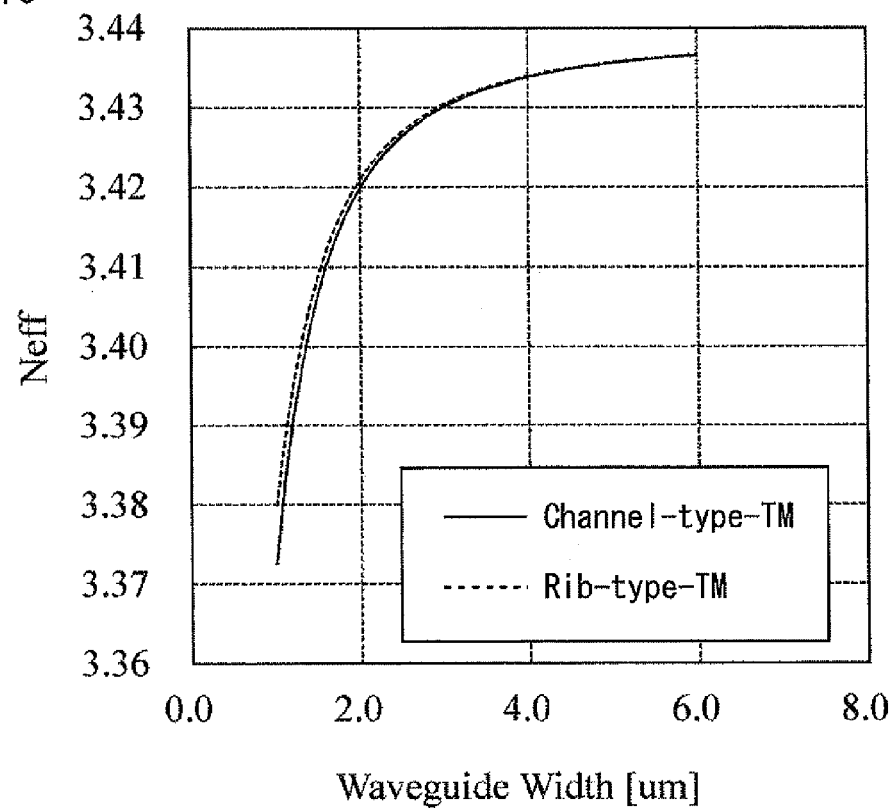
FIG. 10 is a graph showing a dispersion relation of a channel waveguide and a rib waveguide in TM polarized light.

Next, FIGS. 9 and 10 each show a dispersion relation of an Si rib waveguide and an Si channel waveguide. In FIG. 9, the horizontal axis represents a waveguide width, and the vertical axis represents a refractive index with respect to TE polarized light. In FIG. 10, the horizontal axis represents a waveguide width, and the vertical axis represents a refractive index with respect to TM polarized light. FIG. 9 shows the refractive index of the rib waveguide 50, and FIG. 10 shows the refractive index of the channel waveguide 51.

In a region with a large waveguide width, the two waveguide structures appear to substantially overlap each other. Accordingly, $n_{TE1}=n_{TE2}$ holds, and a situation as shown in Expression (3) is expected to be obtained. However, the refractive index difference of TM polarized light is small, which makes it difficult to form the PBS 1 with a realistic size. Specifically, in order to set the phase difference of π with respect to TM polarized light, the arm length L increases and the size of the PBS 1 increases. Therefore, it is necessary to form the PBS 1 in a region with a narrow waveguide width.

Figure 11:
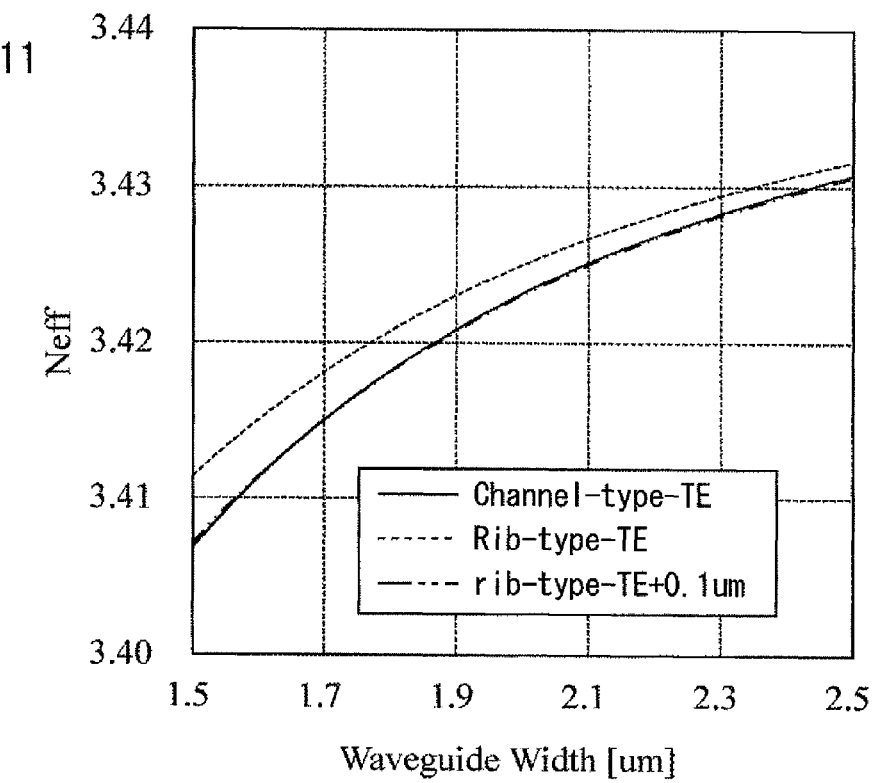
FIG. 11 is a graph showing refractive index matching in TM polarized light.

FIG. 11 shows a dispersion relation obtained when the waveguide width of only the rib waveguide 50 is changed by 0.1 µm in FIG. 9. FIG. 11 shows an enlarged view of a waveguide width W in a range from 1.5 µm to 2.5 µm. As shown in FIG. 11, the dispersion relation of the channel waveguide and the dispersion relation of the rib waveguide can be matched by setting the rib waveguide 50 to be 0.1 µm wider than the channel waveguide 51. For example, the dispersion relation of the channel waveguide and the dispersion relation of the rib waveguide substantially match in the vicinity of the waveguide width of 1.7 µm. This indicates that when the waveguide width of the rib waveguide 50 is set to 1.6 µm and the waveguide width of the channel waveguide 51 is set to 1.7 µm, for example, the manner in which the refractive index changes in the rib waveguide are the same as those in the channel waveguide even if a deviation in waveguide width occurs. Accordingly, the PBS 1 resistant to a process variation in the waveguide width can be formed. Note that the set value of the waveguide width is not determined uniquely, but is instead determined depending on a required arm length, or a required tolerance for the waveguide width. In the case of using the rib waveguide 50, a waveguide width of about 1 to 4 µm is desirable. This allows the refractive index difference between the first arm waveguide 12 and the second arm waveguide 13 to be larger with respect to one of the polarization components. Accordingly, the phase can be shifted between the arms without increasing the size of the PBS 1.

Figure 12:
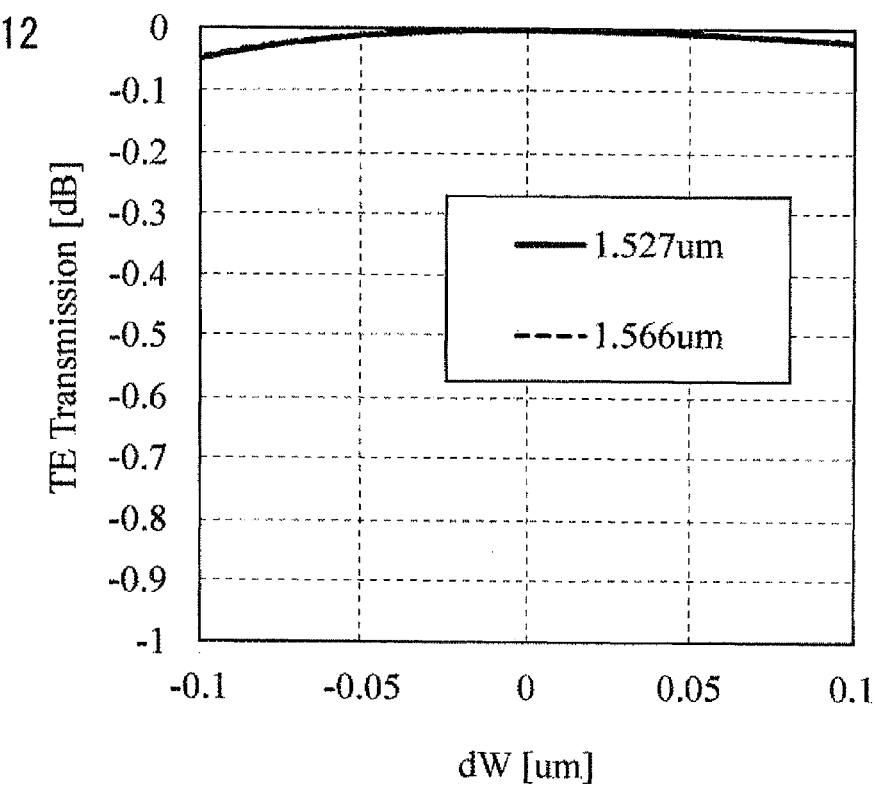
FIG. 12 is a graph showing a tolerance for a waveguide width when the waveguide width is optimized.
Figure 13:
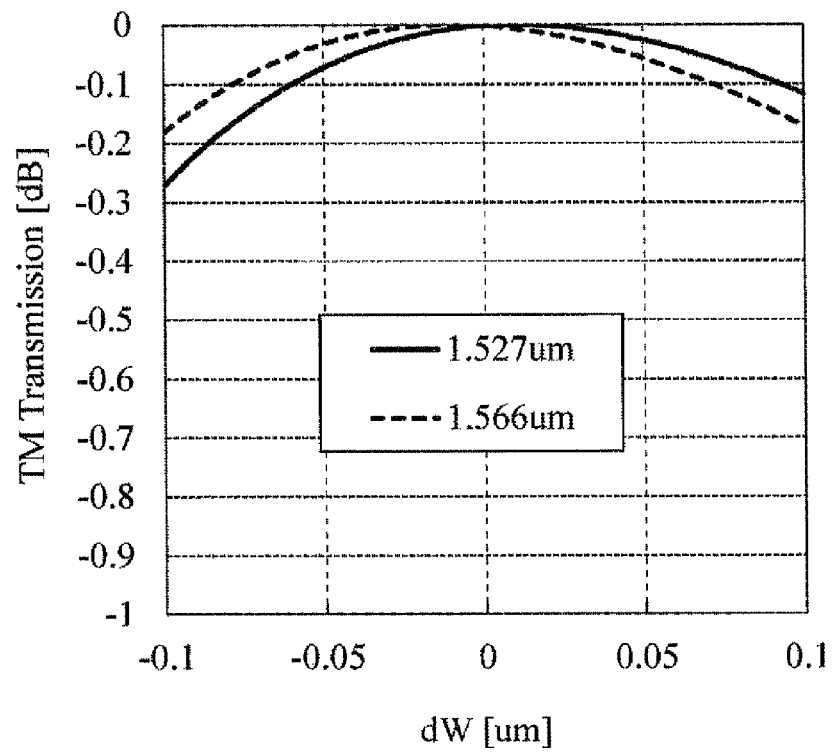
FIG. 13 is a graph showing a tolerance for a waveguide width when the waveguide width is optimized.
Figure 14:
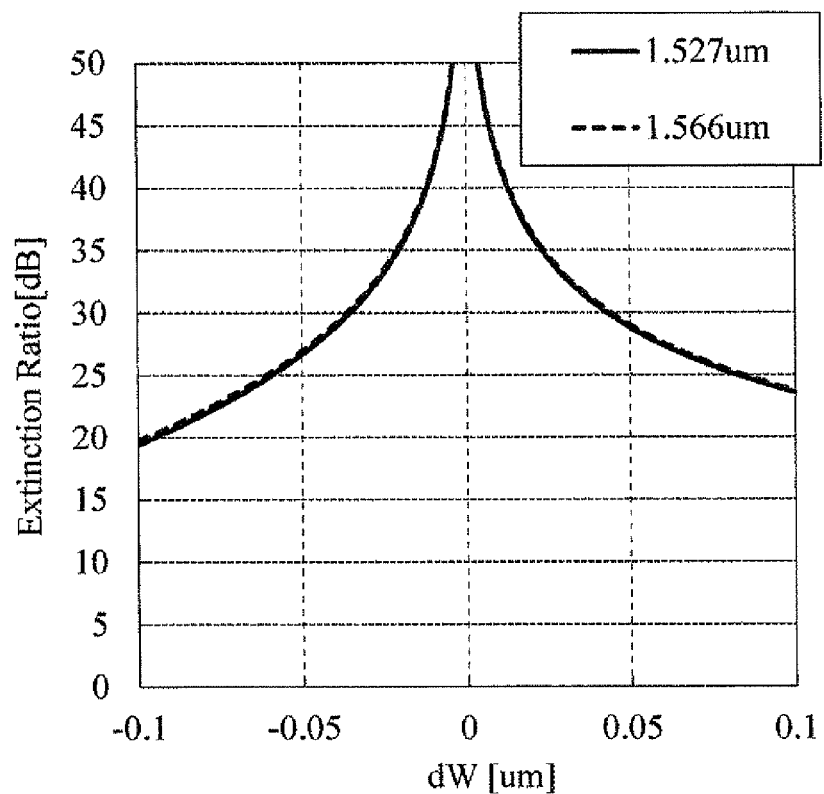
FIG. 14 is a graph showing a tolerance for a waveguide width when the waveguide width is optimized.
Figure 15:
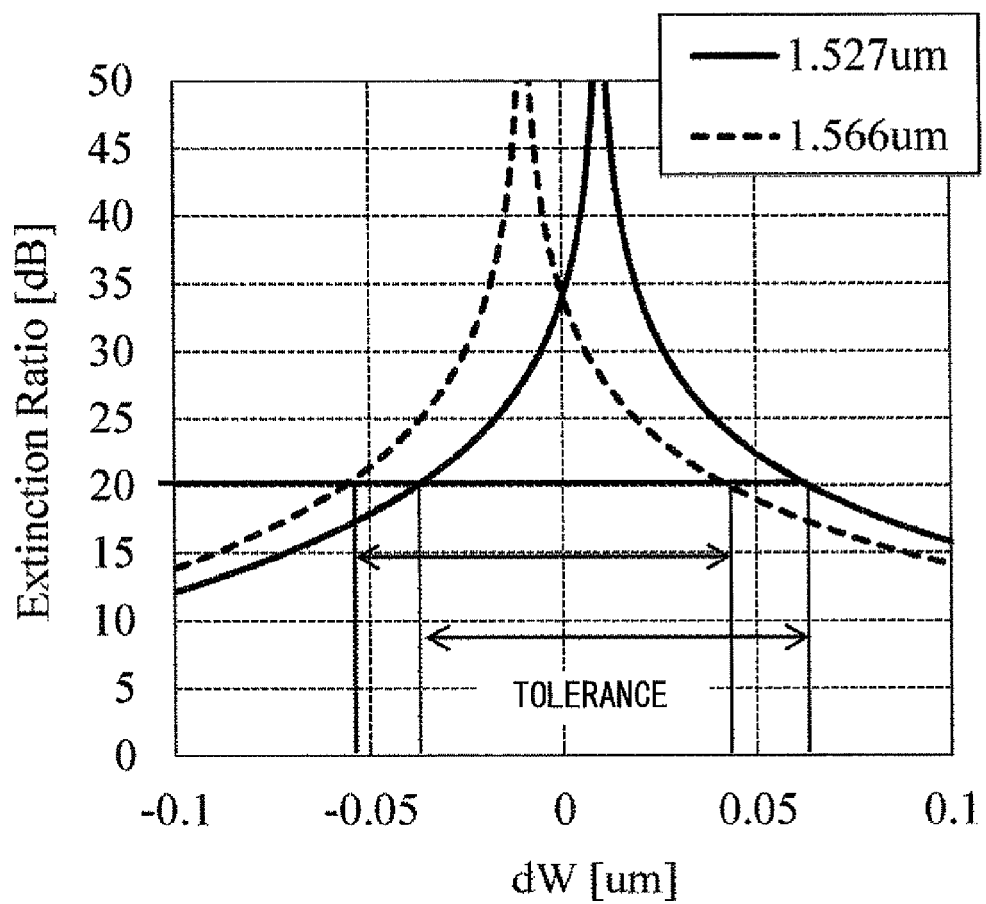
FIG. 15 is a graph showing a tolerance for a waveguide width when the waveguide width is optimized.

FIGS. 12 to 15 show the results of calculating a tolerance of the PBS 1 which is formed based on the above idea. In FIG. 12, the horizontal axis represents the deviation dW of the waveguide width W, and the vertical axis represents a loss of TE polarized light. In FIG. 13, the horizontal axis represents the deviation dW of the waveguide width W, and the vertical axis represents a loss of TM polarized light. In FIG. 14, the horizontal axis represents the deviation dW of the waveguide width W, and the vertical axis represents a polarization extinction ratio with respect to TE polarized light. In FIG. 15, the horizontal axis represents the deviation dW of the waveguide width W, and the vertical axis represents a polarization extinction ratio with respect to TM polarized light.

In this case, the waveguide width of the rib waveguide is 1.91 µm and the waveguide width of the channel waveguide is 2 µm. The tolerance for the deviation dW of the waveguide width is improved as compared with that shown in FIGS. 7 and 8. Even when the deviation dW of the waveguide width increases, a loss is small. It is clear that a sufficient tolerance with respect to a loss can be obtained by matching the dispersion relation of the rib waveguide 50 with the dispersion relation of the channel waveguide 51 with respect to TE polarized light. In this case, however, since the waveguide width is optimized for TE polarized light, a loss of TM polarized light is slightly larger than a loss of TE polarized light, but this increase causes no problem in practical use.

Figure 16:
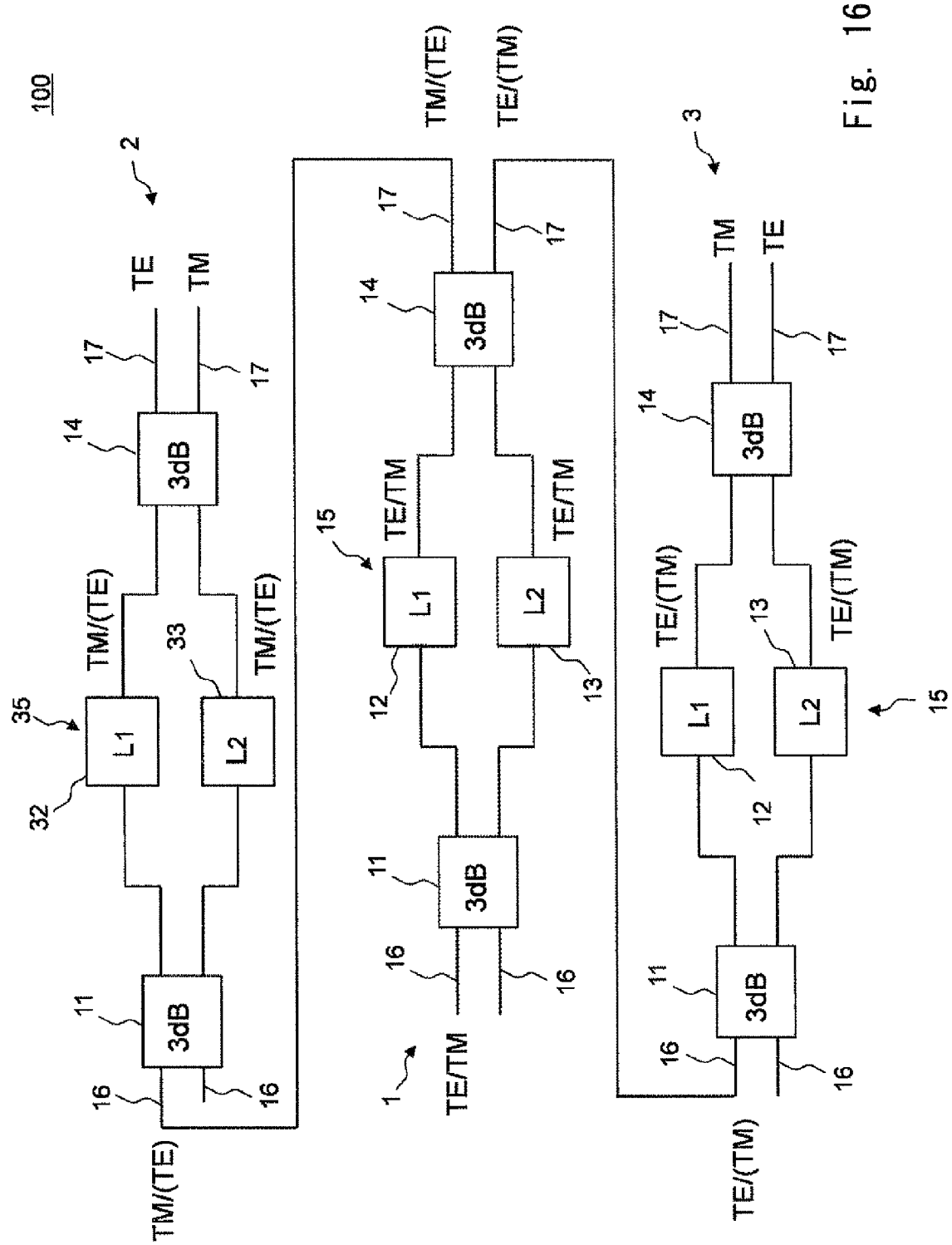
FIG. 16 is a diagram showing an optical device in which PBSs are connected in two stages.

On the other hand, a sufficient polarization extinction ratio cannot be satisfied in a one-stage PBS. Accordingly, since there is a sufficient margin for loss, PBSs are connected in two stages to thereby improve the polarization extinction ratio. FIG. 16 shows the configuration of an optical device 100 in which PBSs are connected in two stages. The optical device 100 includes PBSs 1 to 3 which are connected in multiple stages. The PBS 1 is formed in the first stage, and the PBS 2 and the PBS 3 are formed in the second stage. Accordingly, the PBS 2 and the PBS 3 receive, as input light, the output light output from the PBS 1.

As with the PBS 1 shown in FIG. 2, the PBS 1 and the PBS 3 each include the demultiplexer 11, the first arm waveguide 12, the second arm waveguide 13, the multiplexer 14, the arm portion 15, the input waveguides 16, and the output waveguides 17. Specifically, in the PBS 1 and the PBS 3, one of the first arm waveguide 12 and the second arm waveguide 13 is formed of the rib waveguide 50, and the other one of the first arm waveguide 12 and the second arm waveguide 13 is formed of the channel waveguide 51. Further, the waveguide width of the first arm waveguide 12 and the waveguide width of the second arm waveguide 13 are set to be different from each other so that the dispersion relation of the first arm waveguide 12 substantially matches the dispersion relation of the second arm waveguide 13.

Similarly to the PBS 1, the PBS 2 includes the demultiplexer 11, the multiplexer 14, the input waveguides 16, and the output waveguides 17. The PBS 2 also includes an arm portion 35 including a first arm waveguide 32 and a second arm waveguide 33. The basic configuration of the PBS 2 is similar to that of the PBS 1 shown in FIG. 2. The first arm waveguide 32, the second arm waveguide 33 and the arm portion 35 of the PBS 2 respectively correspond to the arm portion 15, the first arm waveguide 12, and the second arm waveguide 13 of the PBS 1. Also in the PBS 2, one of the first arm waveguide 32 and the second arm waveguide 33 is formed of the rib waveguide 50 and the other one of the first arm waveguide 32 and the second arm waveguide 33 is formed of the channel waveguide 51, in the same manner as in the PBS 1. Further, the waveguide width of the first arm waveguide 32 and the waveguide width of the second arm waveguide 33 are set to be different from each other so that the dispersion relation of the first arm waveguide 32 substantially matches the dispersion relation of the second arm waveguide 33.

The PBS 1 splits each of TM polarized light and TE polarized light into polarized waves, and outputs the polarized waves. One of the output waveguides 17 of the PBS 1 is coupled to the PBS 2, and the other one of the output waveguides 17 of the PBS 1 is coupled to the PBS 3. Accordingly, TM polarized light is input to the input waveguides 16 of the PBS 2 as input light. The input waveguides 16 of the PBS 3 receive TE polarized light as input light. Note that residual polarization components remain in the TM polarized light and the TE polarized light which are split into polarized waves in the PBS 1. Specifically, small amount of TE polarization component remain in the TM polarized light to be input to the PBS 2. Similarly, small amount of TM polarization component remain in the TE polarized light to be input to the PBS 3. In FIG. 16, the residual polarization components are shown in parentheses.

The PBS 2 is optimized for TM polarized light which is input light. Specifically, in the PBS 2, the phase of the first arm waveguide 32 and the phase of the second arm waveguide 33 are matched with respect to TM polarized light. In other words, the first arm waveguide 32 and the second arm waveguide 33 of the PBS 2 are formed with a waveguide width at which the refractive index of the first arm waveguide 32 with respect to the TM polarized light is the same as the refractive index of the second arm waveguide 33 with respect to the TM polarized light and a refractive index change of the first arm waveguide 32 with respect to a change in the waveguide width is the same as a refractive index change of the second arm waveguide 33 with respect to a change in the waveguide width. On the other hand, for the TE polarized light, which is a residual polarization component, the PBS 2 generates a phase difference between the light propagating through the first arm waveguide 32 and the light propagating through the second arm waveguide 33. For the TM polarized light which is extracted from the first stage, an increase in loss can be suppressed by optimizing the PBS 2 in the second stage with respect to the TM polarized light.

The PBS 3 is optimized for TE polarized light which is input light. Specifically, in the PBS 3, the phase of the first arm waveguide 12 and the phase of the second arm waveguide 13 are matched with respect to the TE polarized light. In other words, the first arm waveguide 12 and the second arm waveguide 13 of the PBS 3 are formed with a waveguide width at which the refractive index of the first arm waveguide 12 with respect to the TE polarized light is the same as the refractive index of the second arm waveguide 13 with respect to the TE polarized light and a refractive index change of the first arm waveguide 12 with respect to a change in the waveguide width is the same as a refractive index change of the second arm waveguide 13 with respect to a change in the waveguide width. On the other hand, for the TM polarized light, which is a residual polarization component, the PBS 3 generates a phase difference between the light propagating through the first arm waveguide 12 and the light propagating through the second arm waveguide 13. For the TE polarized light which is extracted from the first stage, an increase in loss can be suppressed by optimizing the PBS 3 in the second stage with respect to the TE polarized light.

Figure 17:
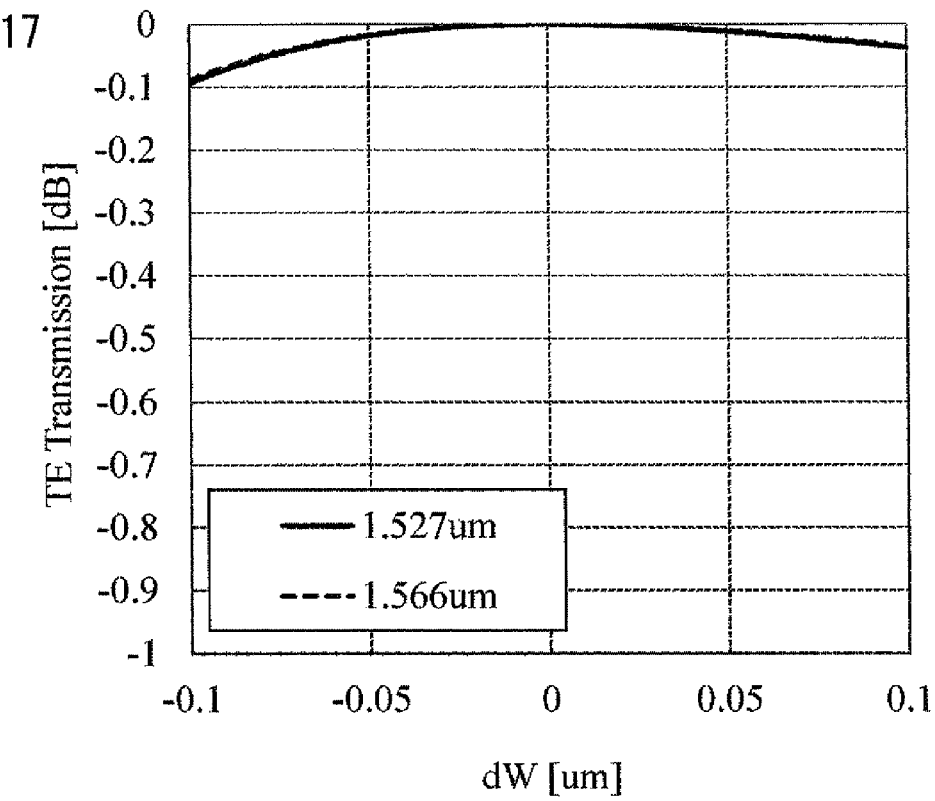
FIG. 17 is a graph showing a tolerance for a waveguide width of the PBSs connected in two stages.
Figure 18:
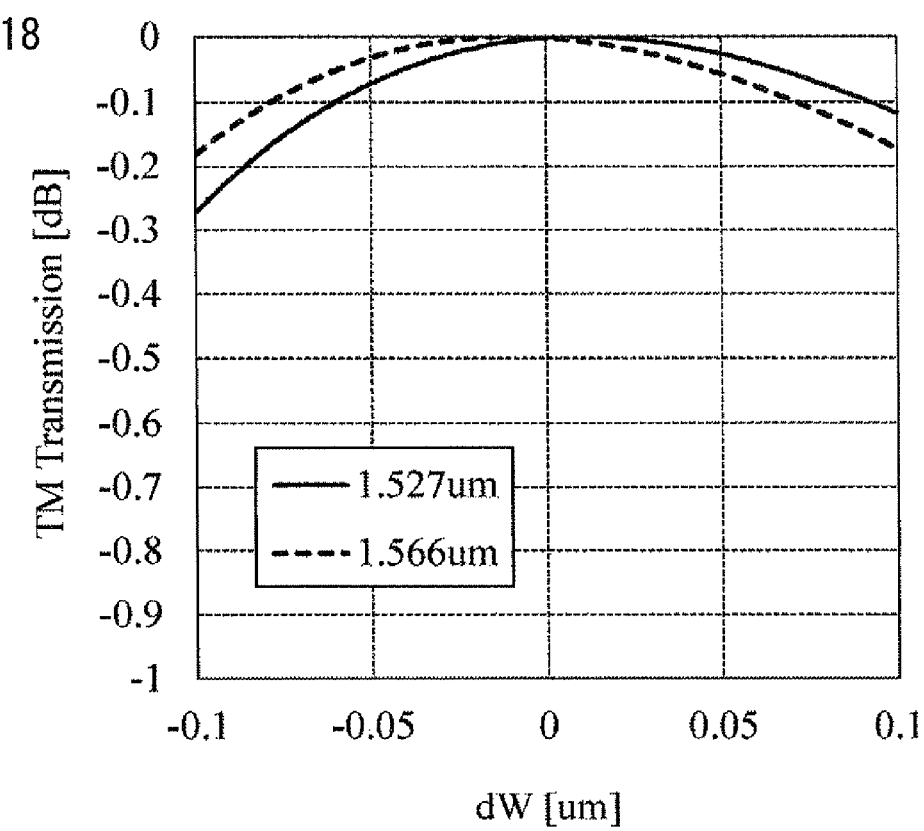
FIG. 18 is a graph showing a tolerance for a waveguide width of the PBSs connected in two stages.
Figure 19:
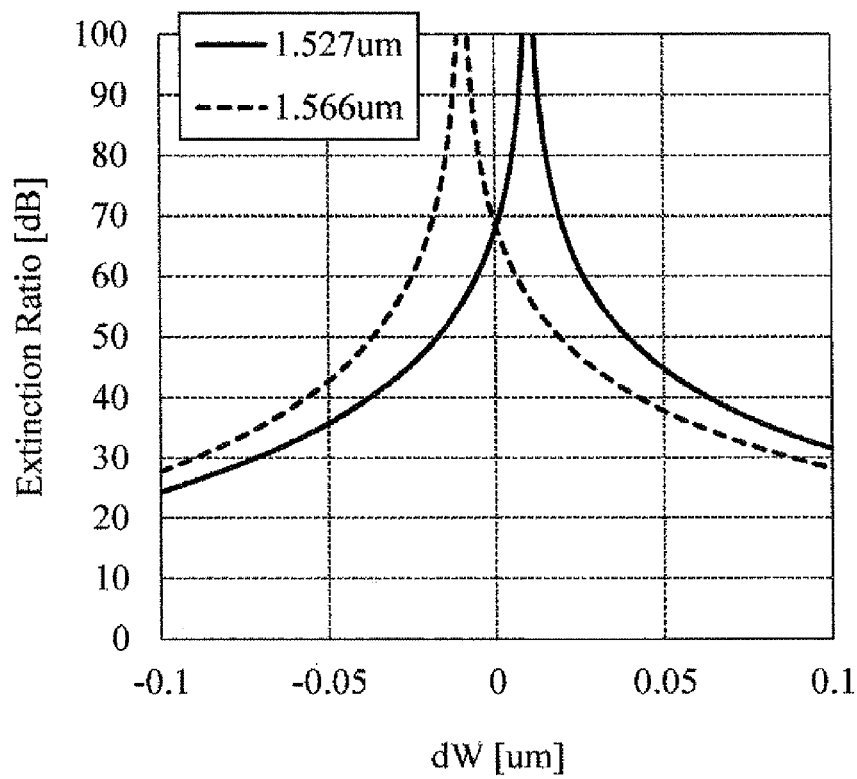
FIG. 19 is a graph showing a tolerance for a waveguide width of PBSs connected in two stages.
Figure 20:
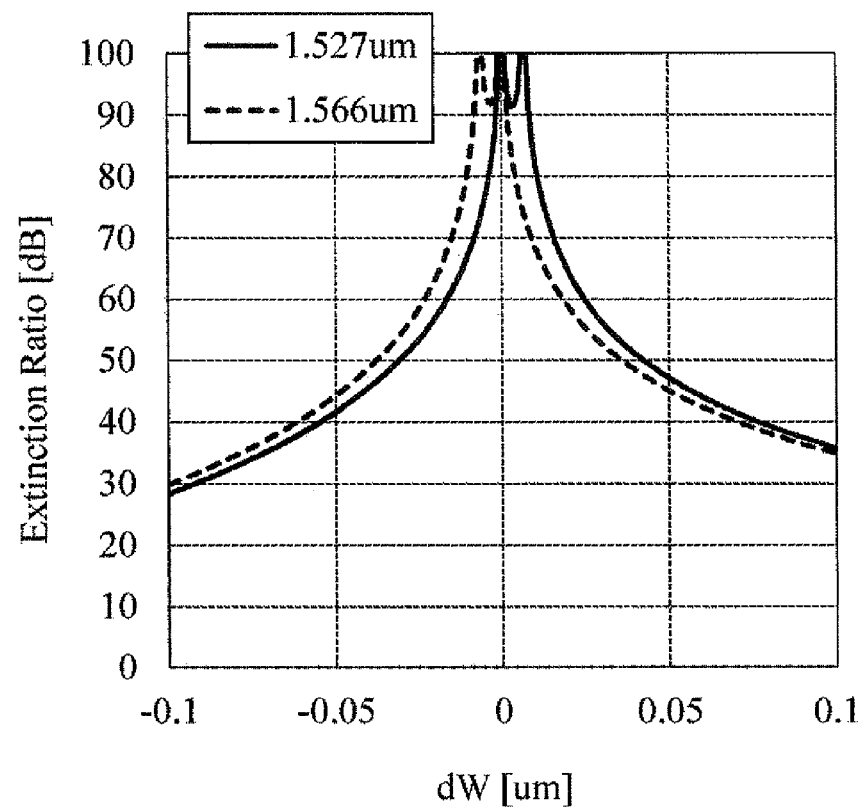
FIG. 20 is a graph showing a tolerance for a waveguide width of the PBSs connected in two stages.

FIGS. 17 to 20 show calculation results when the PBSs 1 are connected in two stages. In FIG. 17, the horizontal axis represents the deviation dW of the waveguide width W, and the vertical axis represents a loss of TE polarized light. In FIG. 18, the horizontal axis represents the deviation dW of the waveguide width W, and the vertical axis represents a loss of TM polarized light. In FIG. 19, the horizontal axis represents the deviation dW of the waveguide width W, and the vertical axis represents a polarization extinction ratio with respect to TE polarized light. In FIG. 20, the horizontal axis represents the deviation dW of the waveguide width W, and the vertical axis represents a polarization extinction ratio with respect to TM polarized light.

As for the PBS 2 on the TM polarized light side, the rib waveguide is 1.94 µm and the channel waveguide is 2 µm. As for the TE polarized light side, as described above, the rib waveguide is 1.91 µm and the channel waveguide is 2 µm. A polarization extinction ratio of 20 dB or more can be ensured for both the TE polarized light and the TM polarized light. Further, the refractive index in the second stage is optimized for each polarized light, so that almost no increase in loss is found even when the PBSs are formed in two stages. Consequently, the PBS in which both a loss and a polarization extinction ratio have a sufficient tolerance for the waveguide width can be formed.

As described above, in one of the linear polarization components orthogonal to each other, the phase of the light propagating through the first arm waveguide 12 and the phase of the light propagating through the second arm waveguide 13 are matched. In the other one of the orthogonal polarization components, the phase of the light propagating through the first arm waveguide 12 and the phase of the light propagating through the second arm waveguide 13 are shifted from each other. One of the first arm waveguide 12 and the second arm waveguide 13 is formed of the rib waveguide 50, and the other one of the first arm waveguide 12 and the second arm waveguide 13 is formed of the channel waveguide 51. The first arm waveguide 12 and the second arm waveguide 13 have the same length but have different widths. For example, the difference between the waveguide width of the rib waveguide 50 and the waveguide width of the channel waveguide 51 is set to about 0.1 µm or less.

In the PBS 1, the first arm waveguide 12 and the second arm waveguide 13 are formed with a waveguide width at which the refractive index of the first arm waveguide 12 with respect to the TE polarized light is the same as the refractive index of the second arm waveguide 13 with respect to the TE polarized light and a refractive index change of the first arm waveguide 12 with respect to a change in the waveguide width is the same as a refractive index change of the second arm waveguide 13 with respect to a change in the waveguide width. On the other hand, the phase of the TE polarized light propagating through the first arm waveguide 12 and the phase of the TE polarized light propagating through the second arm waveguide 13 can be matched. For the TM polarized light, a phase difference is generated between the light propagating through the first arm waveguide 12 and the light propagating through the second arm waveguide 13.

In this manner, the PBS is formed using an Si rib waveguide and an Si channel waveguide as the two arm waveguides. Further, in either TM polarization or the TE polarization, the dispersion relation of the refractive index in the first arm waveguide 12 is matched with that in the second arm waveguide 13. With this configuration, a polarization beam splitter resistant to a process variation in the waveguide width can be obtained.

Furthermore, in order to increase the polarization extinction ratio, PBSs can be connected in multiple stages as shown in FIG. 16. The multiplexer 14 of the PBS 1 at the preceding stage outputs TE polarized light and TM polarized light separately. The demultiplexer 11 of the PBS 2 at the subsequent stage receives the TM polarized light as input light. In the PBS 2, the first and second arm waveguides are formed with a waveguide width at which the refractive index of the first arm waveguide 12 with respect to the TM polarized light is the same as the refractive index of the second arm waveguide 13 with respect to the TM polarized light and a refractive index change of the first arm waveguide 12 with respect to a change in the waveguide width is the same as a refractive index change of the second arm waveguide 13 with respect to a change in the waveguide width. In the PBS 2, a phase difference is generated between the light propagating through the first arm waveguide 12 and the light propagating through the second arm waveguide 13 with respect to the TE polarized light.

The demultiplexer of the PBS 3 at the subsequent stage receives the TE polarized light. In the PBS 3 at the subsequent stage, the first and second arm waveguides are formed with a waveguide width at which the refractive index of the first arm waveguide 12 with respect to the TE polarized light is the same as the refractive index of the second arm waveguide 13 with respect to the TE polarized light and a refractive index change of the first arm waveguide 12 with respect to a change in the waveguide width is the same as a refractive index change of the second arm waveguide 13 with respect to a change in the waveguide width. In the PBS 3, a phase difference is generated between the light propagating through the first arm waveguide 12 and the light propagating through the second arm waveguide 13 with respect to the TM polarized light. Note that only one of the PBS 2 and the PBS 3 may be connected to the subsequent stage of the PBS 1.

PBSs may be connected in three or more stages, as a matter of course. By connecting PBSs in multiple stages and matching the refractive indices of the second and subsequent stages with respect to the polarized light whose loss is intended to be reduced, a polarization beam splitter resistant to a process variation in waveguide width can be achieved. Further, a 90° OH and the like may be provided at subsequent stages of the PBSs connected in multiple stages, and this configuration can be used as a coherent receiver. Furthermore, the PBSs can also be used for optical devices other than a coherent receiver.

Although silicon waveguides have been described above, the waveguides are not limited to the silicon waveguides. For example, semiconductor waveguides, such as InP, can also be used as the waveguides. A compound semiconductor material including various materials can be used for the waveguides.

The present invention has been described above with reference to exemplary embodiments. However, the present invention is not limited to the above exemplary embodiments. The configuration and details of the present invention can be modified in various manners which can be understood by those skilled in the art within the scope of the invention.

This application is based upon and claims the benefit of priority from Japanese patent application No. 2013-91272, filed on Apr. 24, 2013, the disclosure of which is incorporated herein in its entirety by reference.

REFERENCE SIGNS LIST 1-3 PBS
11 Demultiplexer
12 First Arm Waveguide
13 Second Arm Waveguide
14 Multiplexer
15 Arm Portion
16 Input Waveguide
17 Output Waveguide
18 Tapered Arm Waveguide
19 Tapered Arm Waveguide
21 Substrate
22 Lower Clad Layer
23 Core Layer
23a Rib
23b Tapered Portion
24 Upper Clad Layer
50 Rib Waveguide
51 Channel Waveguide

The invention claimed is:
1. A polarization beam splitter comprising:
a demultiplexer that demultiplexes input light into first input light and second input light;
a multiplexer that multiplexes the first input light and the second input light, the first input light and the second input light being obtained by demultiplexing the input light by the demultiplexer;
a first arm waveguide that guides the first input light to the multiplexer, at least a part of the first arm waveguide being formed of a rib waveguide; and a second arm waveguide that guides the second input light to the multiplexer, at least a part of the second arm waveguide being formed of a channel waveguide, wherein the first and second arm waveguides are formed with a first waveguide width and a second waveguide width respectively, such that:

in a first linear polarization components orthogonal to a second polarization component, a refractive index of the first arm waveguide with respect to the input light is the same as a refractive index of the second arm waveguide with respect to the input light, and a refractive index change of the first arm waveguide with respect to a change in the first waveguide width is the same as a refractive index change of the second arm waveguide with respect to a change in the second waveguide width, and in the second orthogonal polarization component, a phase difference is generated between the first input light propagating through the first arm waveguide and the second input light propagating through the second arm waveguide.

2. The polarization beam splitter according to claim 1, wherein the first and second waveguide widths are in a range from 1 to 4 μm.

3. The polarization beam splitter according to claim 1, wherein the first and second arm waveguides have substantially the same length.

4. An optical device comprising:

polarization beam splitters connected in multiple sequential stages, each of the polarization beam splitters comprising:

a demultiplexer that demultiplexes input light into first input light and second input light;

a multiplexer that multiplexes the first input light and the second input light, the first input light and the second input light being obtained by demultiplexing the input light by the demultiplexer;

a first arm waveguide that guides the first input light to the multiplexer, at least a part of the first arm waveguide being formed of a rib waveguide; and a second arm waveguide that guides the second input light to the multiplexer, at least a part of the second arm waveguide being formed of a channel waveguide, wherein the first and second arm waveguides are formed with a first waveguide width and a second waveguide width respectively, such that:

in a first linear polarization components orthogonal to a second polarization component, a refractive index of the first arm waveguide with respect to the input light is the same as a refractive index of the second arm waveguide with respect to the input light, and a refractive index change of the first arm waveguide with respect to a change in the first waveguide width is the same as a refractive index change of the second arm waveguide with respect to a change in the second waveguide width, and in the second orthogonal polarization component, a phase difference is generated between the first input light propagating through the first arm waveguide and the second input light propagating through the second arm waveguide.

5. The optical device according to claim 4, wherein the multiplexer of the polarization beam splitter at a first stage outputs first polarized light and second polarized light separately, the first polarized light and the second polarized light being linear polarization components orthogonal to each other, the demultiplexer of the polarization beam splitter at a second stage subsequent to the first stage receives the first polarized light as the input light, and the first and second arm waveguides of the polarization beam splitter at the second stage are formed with a third waveguide width and a fourth waveguide width respectively, such that in the first polarized light, a refractive index of the first arm waveguide with respect to the input light is the same as a refractive index of the second arm waveguide with respect to the input light and a refractive index change of the first arm waveguide with respect to a change in the third waveguide width is the same as a refractive index change of the second arm waveguide with respect to a change in the fourth waveguide width.

* * * * *